US012767332B2

(12) United States Patent
Judd et al.

(10) Patent No.: US 12,767,332 B2
(45) Date of Patent: Oct. 20, 2026

(54) IN-FLIGHT ENTERTAINMENT SYSTEM CONTROLLING BACKLIGHTING WHILE ERASING RETAINED IMAGES ON LIQUID CRYSTAL DISPLAYS

(71) Applicant: Thales Avionics, Inc., Irvine, CA (US)

(72) Inventors: Kevin Judd, Irvine, CA (US); Ton Do, Corona, CA (US); Shivam Patel, Anaheim, CA (US)

(73) Assignee: Thales Avionics, Inc., Irvine, CA (US)

( * ) Notice: Subject to any disclaimer, the term of this patent is extended or adjusted under 35 U.S.C. 154(b) by 41 days.

(21) Appl. No.: 18/920,041

(22) Filed: Oct. 18, 2024

(65) Prior Publication Data

US 2026/0109461 A1 Apr. 23, 2026

(51) Int. Cl.
*B64D 11/00* (2006.01)
*G02F 1/1335* (2006.01)
*G02F 1/13357* (2006.01)

(52) U.S. Cl.
CPC .. *B64D 11/00153* (2014.12); *B64D 11/00155* (2014.12); *G02F 1/133514* (2013.01); *G02F 1/133528* (2013.01); *G02F 1/133603* (2013.01); *G02F 1/133612* (2021.01)

(58) Field of Classification Search
CPC ............ H04N 21/214; B64D 11/00153; B64D 11/00155; G02F 1/133612; G02F 1/133514; G02F 1/133528; G02F 1/133603
See application file for complete search history.

(56) References Cited

U.S. PATENT DOCUMENTS 10,845,664 B2 * 11/2020 Yu ..................... G02F 1/133308
2020/0341335 A1 * 10/2020 Tsai .................. G02F 1/133606

* cited by examiner

*Primary Examiner* — Randy A Flynn
(74) *Attorney, Agent, or Firm* — Connor K. Purks

(57) ABSTRACT

An LCD display unit of an aircraft inflight entertainment system includes a backlight driver driving light sources of a backlight panel to emit light through a polarizer layer and transistor array layer toward a liquid crystal layer. An LCD controller operates, during an image display mode, to receive data defining an image, and control transistors of the transistor array layer to directionally orient liquid crystals of corresponding pixels of the liquid crystal layer relative to a polarization direction of the polarization layer to define the image. The LCD controller further operates, during a retained pattern erase mode, to control the backlight driver to turn off or dim below a threshold level the backlight panel and to selectively control transistors of the transistor array layer to repetitively cycle orientations of liquid crystals between at least two offset directions to at least partially erase a retained pattern bias among the pixels.

18 Claims, 3 Drawing Sheets

IN-FLIGHT ENTERTAINMENT SYSTEM CONTROLLING BACKLIGHTING WHILE ERASING RETAINED IMAGES ON LIQUID CRYSTAL DISPLAYS

TECHNICAL FIELD

The present disclosure relates to controlling operation of liquid crystal display devices which can be used in in-flight entertainment systems.

BACKGROUND

Modern aircraft are equipped with sophisticated in-flight entertainment (IFE) systems designed to enhance the passenger experience. These systems usually feature liquid crystal displays (LCDs) installed at various locations such as seatback surfaces, armrests, and seating area partitions. These displays provide passengers with access to a wide range of entertainment options, including movies, TV shows, music, games, and real-time flight information. The integration of LCDs into cabin environments in this manner has become a standard feature in many commercial aircraft, reflecting the industry's commitment to passenger comfort and satisfaction.

Airlines strive to maximize the utilization of their aircraft to ensure profitability. This means that planes are kept in operation as much as possible, with minimal downtime between flights. As a result, the LCDs in IFE systems experience high levels of usage over their operational lifetime. Passengers on long-haul flights, in particular, may use these displays for extended periods, leading to significant wear and tear. The continuous use of these systems can lead to issues commonly referred to as screen burn-in, pixel degradation, and other forms of display deterioration. LCDs have the ability in most cases to reverse this retained image. Given the high cost associated with replacing LCDs on aircraft, it is important to implement measures to reduce or prevent degradation of LCDs and extend their operational life.

SUMMARY

LCDs are a primary display technology used in inflight entertainment systems onboard aircraft. LCD seat video display units can experience retained pattern bias problems ("screen burn-in") due to a small set of defined indicia being displayed over relatively long periods of time, e.g., airline logo, static large-graphic touch button and/or menu layout, etc. Moreover, the LCDs are rarely turned-off while passengers are inattentive or sleeping, resulting in a static image being displayed. Embodiments of the present disclosure are directed to performing erasure operations through LCD seat video display units to avoid or erase retained pattern biases that can become perceptible to passengers, and to carrying out the performance in various ways that avoid passengers' perception of ongoing erasure operations.

Some example embodiments are directed to a LCD display unit that includes a backlight panel, a polarizer layer on the backlight panel, a transistor array layer on the polarizer layer, a liquid crystal layer on the transistor array layer, a color filter layer on the liquid crystal layer, a backlight driver, and an LCD controller. The polarizer layer has a uniform polarization direction. Transistors of the transistor array layer are operable to generate fields controlling directional orientation of liquid crystals forming pixels of the liquid crystal layer. The backlight driver is connected to drive light sources of the backlight panel to emit light through the polarizer layer and the transistor array layer toward the liquid crystal layer.

The LCD controller is operative, during an image display mode, to receive data defining an image to be displayed, and control transistors of the transistor array layer based on the data to directionally orient liquid crystals of corresponding pixels of the liquid crystal layer relative to the polarization direction of the polarization layer to adjust light transmissivity of the corresponding pixels and define the image.

Furthermore, The LCD controller is operative, during a retained pattern erase mode, to control the backlight driver to turn off or dim below a threshold level the light sources of the backlight panel, and while maintaining the light sources of the backlight panel turned off or dimmed below the threshold level, to selectively control transistors of the transistor array layer to repetitively cycle directional orientations of liquid crystals of corresponding pixels between at least two offset directions to at least partially erase a retained pattern bias among the pixels.

As will be explained in detail below, the LCD display unit can thereby avoid or erase retained pattern biases that can become perceptible to passengers, and performing the retained pattern erase mode in ways adapted to avoid passengers' perception of the ongoing erasure operations.

Other LCD display units and corresponding methods and computer program products according to embodiments of the present disclosure will be or become apparent to one with skill in the art upon review of the following drawings and detailed description. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of aspects of the invention. However, it will be understood by those skilled in the art that the present invention may be practiced without these specific details. In other instances, well-known methods, procedures, components and circuits have not been described in detail so as not to obscure the present invention.

As explained above, LCD seat video display units ("LCD display units" and "display units") of aircraft inflight entertainment (IFE) systems can be particularly prone to experiencing retained pattern bias problems ("screen burn-in") due to a small set of defined indicia being displayed over relatively long periods of time, e.g., airline logo, static large-graphic touch button layout, static large-graphic menu layout, etc. Moreover, in some IFE configurations the LCDs are not turned-off or are turned off upon expiration of a long idle time threshold while passengers are inattentive or sleeping, resulting in a static image being displayed. However, although some embodiments are explained herein in the context of LCD display units used in aircraft IFE systems, these and other embodiments are not limited thereto and may be used with other types of vehicles, including, without limitation, ships (e.g., cruise ships), buses, and trains, and in non-vehicle applications such as smart phones, tablet computers, laptop computers, computer monitors, televisions, gaming devices, etc.

Figure 1:
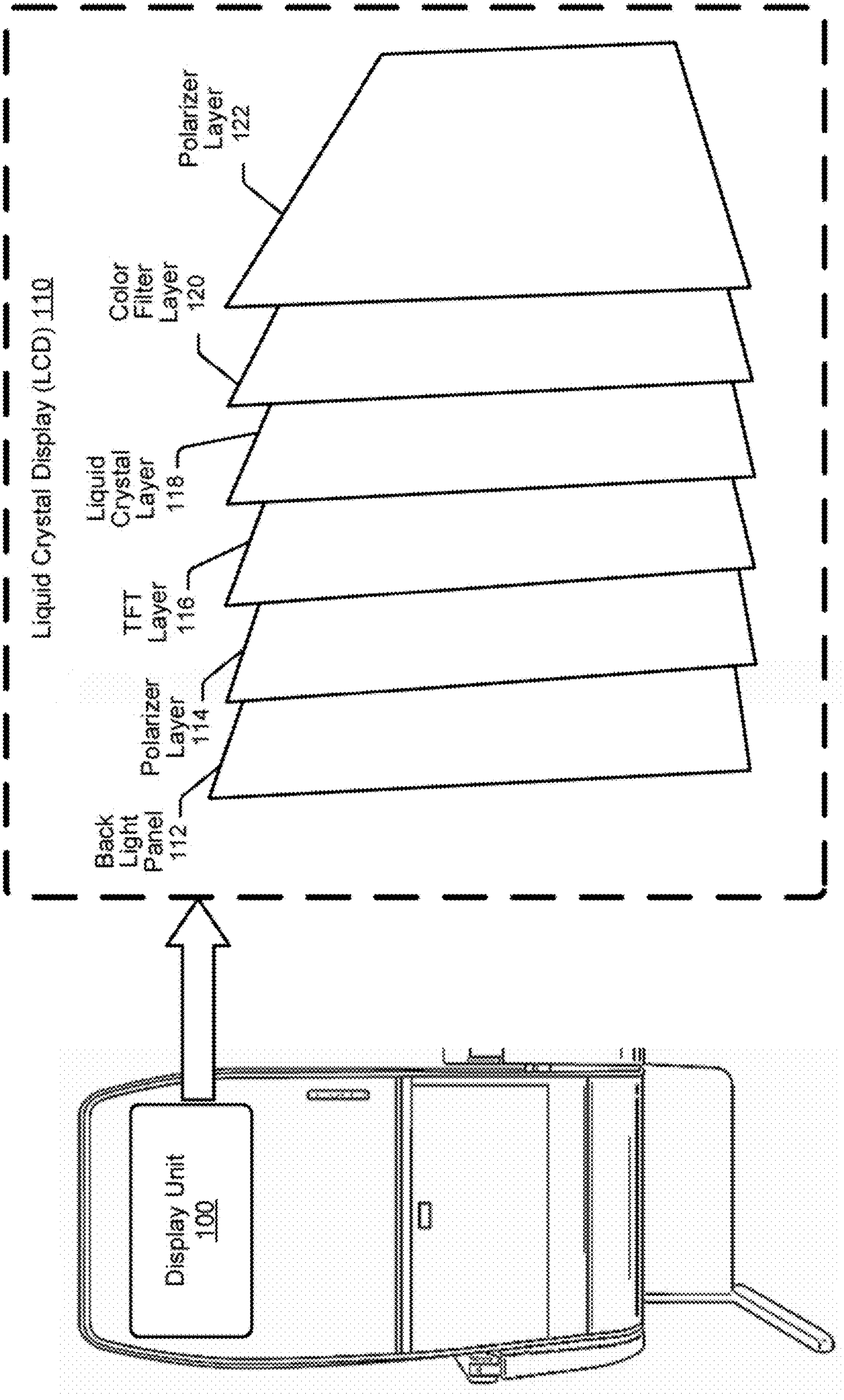
FIG. 1 illustrates an aircraft seat LCD display unit of an inflight entertainment system and an exploded view of example components of the LCD configured according to some embodiments.

FIG. 1 illustrates an aircraft seat LCD display unit 100 of an inflight entertainment system and an exploded view of components of an LCD 110 of the display unit 100 configured according to some embodiments.

Referring to FIG. 1, the example LCD 110 includes a backlight panel 112, a polarizer layer 114 on the backlight panel 112, a transistor array layer 116 (e.g., thin-film transistor layer) on the polarizer layer 114, a liquid crystal layer 118 on the transistor array layer 116, and a color filter layer 120 on the liquid crystal layer 118. The LCD 110 may further include another polarizer layer 122 configured to enhance contrast and clarity of the image from the liquid crystal layer 118 passed through the color filter layer 120.

The backlight panel 112 is configured to provide the necessary illumination for the display, and includes light sources that emit light uniformly across the screen. Example light sources can include light emitting diodes (LEDs), electroluminescent panels/foils (ELs), cold cathode fluorescent lamps (CCFLs), hot cathode fluorescent lamps (HCFLs) External Electrode Fluorescent Lamps (EEFLs), traditional incandescent light bulbs, etc.

When LEDs are used as light sources for transmissive LCD backlighting, they may be configured as direct view LEDs (full-array of LEDs emitting perpendicular to the plane of display surface) or as side view LEDs (emitting light parallel to the plane of the display surface). When direct view LEDs are used, they may be grouped into an array LEDs on a panel or array of tiles. When side view LEDs are used, the backlight panel can include a light-guiding plate, light-diffusion plate, optical sheets, etc., that uniformly spread the light across the panel.

The polarizer layer 114 has a uniform polarization direction which polarizes the light from the backlight panel 112 by allowing only light waves oriented in the polarization direction to pass through.

The TFT layer 116 contains an array of thin transistors and capacitors. The transistors are operable to generate fields controlling directional orientation of liquid crystals forming pixels of the liquid crystal layer 118.

The light then passes through the color filter layer 120 containing an array of, e.g., red, green, and blue, filters that create subpixel colors seen on the display. Each pixel can therefore be divided into sub-pixels, each with a different color filter, and the combination of these sub-pixels produces a wide range of colors. The intensity of light passing through individual sub-pixels is adjusted by controlling the directionally orientation of the liquid crystals of corresponding sub-pixels of the liquid crystal layer to produce a wide range of pixel colors.

Figure 2:
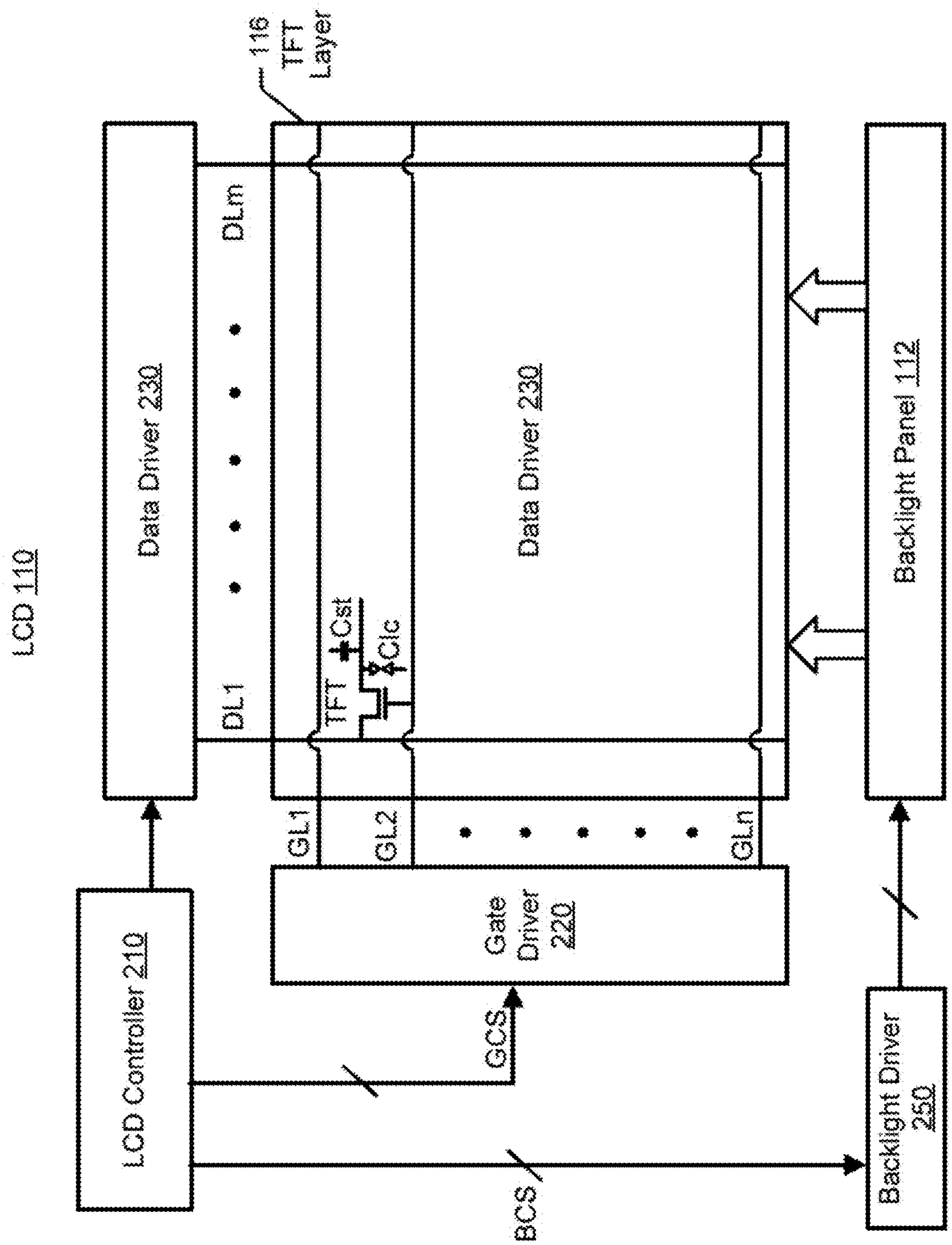
FIG. 2 illustrates a block diagram of some components of the LCD display unit including an LCD controller configured to operate according to some embodiments.

FIG. 2 illustrates a block diagram of some components of the LCD display unit 100 including an LCD controller 210 configured according to some embodiments.

Referring to FIG. 2, the TFT layer 116 includes a plurality of gate lines (GL1 to GLn), a plurality of data lines (DL1 to DLm), which are aligned with a plurality of liquid crystal cells (Cle, pixel regions) provided in the liquid crystal layer 118 defined by crossings of the plurality of gate lines and the plurality of data lines. The liquid crystal cell includes a storage capacitor (Cst) and a TFT formed adjacent to the crossing portion of the gate and data lines. An analog data signal (data voltage) is supplied via the data lines in response to a scan signal supplied via the gate lines to the liquid crystal cells.

A backlight driver 250 drives the light sources of the backlight panel 112 in accordance with a backlight control signal (BCS) supplied by the LCD controller 210. The backlight driver 250 controls on-off state and luminance of the light sources responsive to the BCS.

A gate driver 220 generates the scan signal for driving the transistors of the TFT layer 116 in each liquid crystal cell on the basis of a gate control signal (GCS) supplied from the timing controller 160 to the gate driver 220; and then sequentially supplies the generated scan signal to the gate lines (GL1 to GLn) of the LCD 110, to thereby drive (switch) the thin film transistor (TFT).

The data driver 230 converts digital image data (red (R), green (G), blue (B)) supplied from the LCD controller 210 to the analog data signal (data voltage). The converted analog data signal is supplied to the data lines in response to a data control signal (DCS) supplied from the LCD controller 210. The analog data signal is supplied to the respective liquid crystal cells turned-on by the scan signal.

The LCD controller 210 aligns externally-provided data defining an image to be displayed, converts the data to digital image data (R, G, B) by frame unit, and supplies the digital image data aligned by frame unit to the data driver 230. The LCD controller 210 thereby sends signals to the row and column lines of the grid to address specific pixels. The electric field generated by the voltage of the TFT causes the liquid crystals to align in a specific direction. This alignment changes the way light passes through the liquid crystal layer relative to the polarization layer 114. Depending on the orientation of the liquid crystals, the amount of light passing through the pixel is modulated. This modulation, combined with the color filters, creates the desired color and brightness for each pixel.

In accordance with some embodiments, the LCD controller 210 is operative to perform erasure operations to reduce or avoid retained pattern biases that form in the liquid crystal layer 118 due to, for example, a small set of defined indicia being displayed over relatively long periods of time, such as an airline logo, static large-graphic touch button layout, static large-graphic menu layout, etc. Moreover, as will be explained below, the LCD controller 210 can carrying out the erasure operations in various ways that are adapted to avoid passengers' perception of the erasure operations.

In some embodiments, the LCD controller 210 alternately operates in an image display mode or retained pattern erase mode.

While operating in the image display mode, the LCD controller 210 receives data defining an image to be displayed, and controls transistors of the transistor array layer 116 based on the data to directionally orient liquid crystals of corresponding pixels of the liquid crystal layer 118 relative to the polarization direction of the polarizer layer 114 to adjust light transmissivity of the corresponding pixels and define the image.

In contrast, while operating in the retained pattern erase mode the LCD controller 210 controls the backlight driver 250 to turn off or dim below a threshold level the light sources of the backlight panel 112. While maintaining the light sources of the backlight panel 112 turned off or dimmed below the threshold level, the LCD controller 210 selectively controls transistors of the transistor array layer 116 to repetitively cycle directional orientations of liquid crystals of corresponding pixels between at least two offset directions to at least partially erase a retained pattern bias among the pixels.

When the display unit 100 with the LCD 110 is configured to be mounted to a passenger seat onboard an aircraft, the LCD controller 210 can be further operative to initiate switching from the image display mode to the retained pattern erase mode based on a signal indicating an aircraft cabin door is open and/or the aircraft is on ground. In this manner, the retained pattern erase mode can be performed while the IFE system is normally not used by passengers or disabled from use by passengers.

Instead of just dimming luminance of the light sources, the light sources of the backlight panel 112 may be maintained powered off to prevent or reduce viewability of the effect on the LCD 110 during the retained pattern erase mode. Thus, for example, the LCD controller 210 may be further operative during the retained pattern erase mode to control the backlight driver 250 to turn off and maintain off the light sources of the backlight panel 112 while selectively controlling transistors of the transistor array layer 116 to repetitively cycle the directional orientation of liquid crystals of corresponding pixels between the at least two offset directions to at least partially erase a retained pattern bias among the pixels.

Because some colors of display pixels are more prominent and occur more frequently as components of images (e.g., menus borders, touch selectable button indicia, etc.), pixels (subpixels) associated with one color of display pixels can obtain a greater retained pattern bias over time relative to one or more other colors. Alternatively or additionally, humans may more easily perceive (identify in viewed images) retained pattern bias occurring with respect to one color of display pixels more than with respect to other colors of display pixels. Some embodiments are therefore directed to more completely remedying color associated retained pattern bias.

One approach cycles the liquid crystals associated with one color between directions have a greater angular offset than is used with one or more other colors, e.g., to more completely erase bias exhibited by that one color during an erase mode duration. In one embodiment, the LCD controller 210 is further operative during the retained pattern erase mode to, while maintaining the light sources of the backlight panel 112 turned off or dimmed below the threshold level, selectively control transistors of the transistor array layer 116 to repetitively cycle the directional orientation of liquid crystals of corresponding pixels spatially aligned with a first color area of the color filter layer between first and second offset directions having a first angular offset. The LCD controller 210 selectively control other transistors of the transistor array layer 116 to repetitively cycle the directional orientation of liquid crystals of corresponding pixels spatially aligned with a second color area of the color filter layer between third and fourth offset directions having a second angular offset, wherein the first color is different than the second color. The first angular offset is greater than the second angular offset.

It is believed that the following angular offset ranges can beneficially increase the ability of the LCD controller to erase the retain pattern bias in liquid crystals associated with a more perceivable pixel color, while reducing the wear on liquid crystals associated with one or more other pixel colors and enabling more frequent cycles of those other one or more other pixel colors by the decreased angular offset through which the liquid crystals are cycles. In one embodiment, the first angular offset is greater than 45 degrees and the second angular offset is between 15 and 45 degrees. In another embodiment, the first angular offset is greater than 75 degrees and the second angular offset is between 45 and 75 degrees. In still another embodiment, the first angular offset is greater than 90 degrees and the second angular offset is between 45 and 90 degrees.

In a further related embodiment, the LCD controller 210 is further operative during the retained pattern erase mode to, while maintaining the light sources of the backlight panel turned off or dimmed below the threshold level, selectively control other transistors of the transistor array layer 116 to repetitively cycle the directional orientation of liquid crystals of corresponding pixels spatially aligned with a third color area of the color filter layer between fifth and sixth offset directions having a third angular offset. The third color is different than the first and second colors. The third angular offset is less than the second angular offset. The first, second, and third colors can be different ones of red, green, and blue color filters.

Another approach cycles the liquid crystals associated with one color through an angular offset for a different time duration than is used when cycling one or more other colors. For example, the liquid crystals associated with blue pixels may be cycled for a longer time duration than the liquid crystals associated with red pixels or vice versa.

In one illustrative embodiment, the LCD controller 210 is further operative during the retained pattern erase mode to, while maintaining the light sources of the backlight panel 112 turned off or dimmed below the threshold level, selectively control transistors of the transistor array layer to repetitively cycle at a frequency during a first time duration the directional orientation of liquid crystals of corresponding pixels spatially aligned with a first color area of the color filter layer between offset directions. The LCD controller 210 is further operative to selectively control other transistors of the transistor array layer 116 to repetitively cycle at a frequency during a second time duration the directional orientation of liquid crystals of corresponding pixels spatially aligned with a second color area of the color filter layer between offset directions. The first color is different than the second color. The first time duration is greater than the second time duration.

In a further embodiment, the LCD controller 210 is further operative during the retained pattern erase mode to, while maintaining the light sources of the backlight panel 112 turned off or dimmed below the threshold level, selectively control other transistors of the transistor array layer 116 to repetitively cycle at a frequency during a third time duration the directional orientation of liquid crystals of corresponding pixels spatially aligned with a third color area of the color filter layer between offset directions. The third color is different than the first and second colors, and the third time duration is less than the second time duration. The first, second, and third colors can be different ones of red, green, and blue color filters.

It has been presently determined that an erase operation may include cycling pixels between 3 to 5 seconds per color when providing a color display or between black and white when providing a black and white display.

When static images are displayed between 1 to 4 hours, it has been presently determined that a 10 minute process of the retained pattern erase mode is needed to erase the retained image.

In contrast, when static images are displayed for 14 hours, it has been presently determined that a 20 minute process of the retained pattern erase mode is needed to erase the retained image.

In contrast, when static images are displayed for 24 hours, it has been presently determined that a 20 minute process of the retained pattern erase mode can be used to sufficiently erase the retained image.

In the context of the previous embodiment, it has been presently determined that the first time duration can be greater than 10 minutes and the second time duration can be between 10 minutes and 1 minute to obtain sufficient retained pattern bias erasure. In another embodiment, the first time duration is greater than 20 minutes and the second time duration is between 20 minutes and 10 minutes.

It has also been presently determined that pure white is the most noticeable by the human eye against dark backgrounds. Performance of the corresponding retained pattern erase mode to mitigate the retained pattern bias can therefore use colors that are not pure white, for example using grey instead of white.

Because pattern bias in the pixels is associated with displaying one or more static patterns (e.g., menu borders and touch screen buttons or indicia) for sufficiently long duration, some further embodiments are directed to performing the retained pattern erase mode to mitigate the retained pattern bias corresponding to the static pattern(s). The retained pattern erase mode can therefore be operated to predominately or exclusively cycle the pixels at locations of the pattern(s), which can speed-up the erasure process and reduce any wear on the display arising from the erasure process.

In one illustrative embodiment, the LCD controller 210 is further operative during the retained pattern erase mode to retrieve from a memory of the display unit 100 a pattern in an image that has been displayed through the liquid crystal layer 118. While maintaining the light sources of the backlight panel 112 turned off or dimmed below the threshold level, the LCD controller 210 selectively controls transistors of the transistor array layer 116 to repetitively cycle at a frequency during a first time duration the directional orientation of liquid crystals of pixels corresponding to locations within the pattern between the at least two offset directions to at least partially erase a retained pattern bias among the pixels. The LCD controller 210 also selectively control transistors of the transistor array layer to repetitively cycle at a frequency during a second time duration the directional orientation of liquid crystals of pixels corresponding to locations outside the pattern between the at least two offset directions, where the first time duration is greater than the second time duration.

The LCD controller 210 may identify and save the image to focus on erasing. In one embodiment, the LCD controller 210 is further operative to, responsive to determining that the image that has been displayed through the liquid crystal layer 118 for at least a threshold time, store the image in the memory of the display unit 100 for use during the retained pattern erase mode.

Another approach cycles the liquid crystals associated with one color through an angular offset at a different frequency than is used when cycling one or more other colors. For example, the liquid crystals associated with blue pixels may be cycled at a higher frequency than the liquid crystals associated with red pixels, or vice versa.

In one illustrative embodiment, the LCD controller 210 is further operative during the retained pattern erase mode to retrieve from a memory of the display unit 100 a pattern in an image that has been displayed through the LCD 110. While maintaining the light sources of the backlight panel 112 turned off or dimmed below the threshold level, the LCD controller 210 selectively controls transistors of the transistor array layer 116 to repetitively cycle at a first frequency for a first time duration the directional orientation of liquid crystals of pixels corresponding to locations within the pattern between the at least two offset directions to at least partially erase a retained pattern bias among the pixels. The LCD controller 210 also selectively controls transistors of the transistor array layer 116 to repetitively cycle at a second frequency for a second time duration the directional orientation of liquid crystals of pixels corresponding to locations outside the pattern between the at least two offset directions, where the first frequency is greater than the second frequency.

In a further embodiment, the LCD controller 210 is further operative to, responsive to determining that the pattern in the image has been displayed through the liquid crystal layer 118 for at least a threshold time, store the pattern in the memory of the display unit 100 for use during the retained pattern erase mode.

The first and second time durations may be the same to effectively erase a retained pattern bias in some types of LCDs. In contrast, the first time duration is greater than the second time duration to effectively erase a retained pattern bias in some other types of LCDs.

Figure 3:
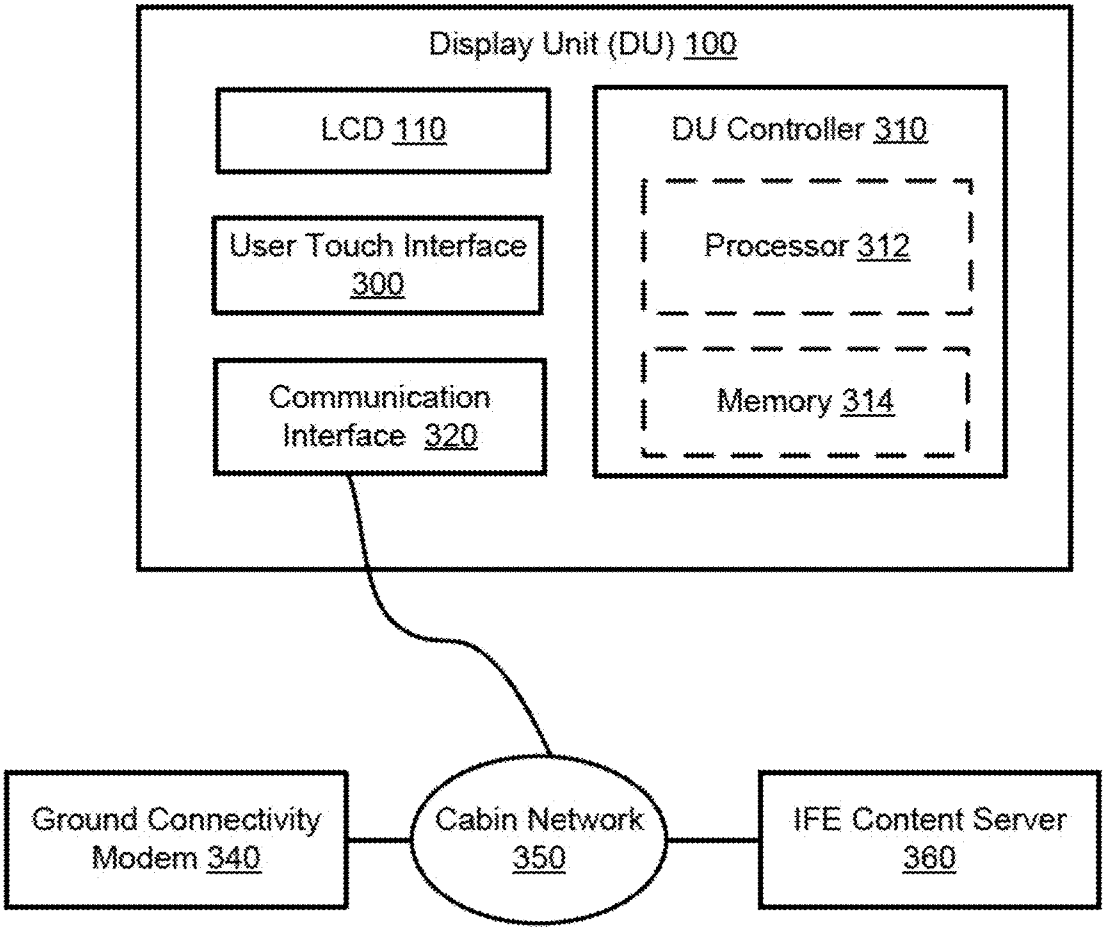
FIG. 3 illustrates a block diagram of some components of an aircraft inflight entertainment system configured according to some embodiments.

FIG. 3 illustrates a block diagram of some components of an aircraft inflight entertainment system configured according to some embodiments.

Referring to FIG. 3, the display unit 100 may be mounted in a seatback, armrest, seating partition, or elsewhere. The display unit 100 is operable by a passenger to control selection and delivery of content from an IFE content server 360 to the display unit 100, control selection and delivery of ground-based content through a ground connectivity modem 340 connected through a satellite network with Internet servers (e.g., browser Internet web servers), stream content through over-the-top servers (e.g., Netflix), play games, etc.

The display unit 100 includes the LCD 110, a user input interface 300 (e.g., touch sensitive interface panel on the LCD 110), and a display unit (DU) controller 310. The DU controller 310 may include at least one processor 312 that executes instructions stored in at least one memory 314 to control other components of the display unit 100 and the system to perform operations in accordance with one or more of the embodiments disclosed herein. The DU controller 310 may alternatively or additionally include an application specific integrated circuit configured to operate in accordance with one or more of the embodiments disclosed herein. The LCD controller 210 illustrated in FIG. 2 may be at least partially incorporated into the DU controller 310.

The display unit 100 includes a communication interface 320 which communicates through one or more cabin networks 350 (e.g., wired and/or wireless networks) with the IFE content server 360 and the ground connectivity modem 340.

Further Definitions and Embodiments:

In the above description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A non-transitory computer-readable medium may include an electronic, magnetic, optical, electromagnetic, or semiconductor data storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, etc.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A liquid crystal display, LCD, display unit comprising:

a backlight panel;

a polarizer layer on the backlight panel, the polarizer layer having a uniform polarization direction;

a transistor array layer on the polarizer layer;

a liquid crystal layer on the transistor array layer, wherein transistors of the transistor array layer are operable to generate fields controlling directional orientation of liquid crystals forming pixels of the liquid crystal layer;

a color filter layer on the liquid crystal layer;

a backlight driver connected to drive light sources of the backlight panel to emit light through the polarizer layer and the transistor array layer toward the liquid crystal layer; and an LCD controller operative to:

during an image display mode receive data defining an image to be displayed, and control transistors of the transistor array layer based on the data to directionally orient liquid crystals of corresponding pixels of the liquid crystal layer relative to the polarization direction of the polarizer layer to adjust light transmissivity of the corresponding pixels and define the image; and during a retained pattern erase mode, control the backlight driver to turn off or dim below a threshold level the light sources of the backlight panel, and while maintaining the light sources of the backlight panel turned off or dimmed below the threshold level, selectively control transistors of the transistor array layer to repetitively cycle directional orientations of liquid crystals of corresponding pixels between at least two offset directions to at least partially erase a retained pattern bias among the pixels.

2. The LCD display unit of claim 1, wherein the LCD display unit is configured to be mounted to a passenger seat onboard an aircraft, and the LCD controller is further operative to initiate switching from the image display mode to the retained pattern erase mode based on expiration of an idle time threshold, a signal indicating an aircraft cabin door is open, and/or a signal indicating the aircraft is on ground.

3. The LCD display unit of claim 1, wherein the LCD controller is further operative during the retained pattern erase mode to:

control the backlight driver to turn off the light sources of the backlight panel such that no backlight illumination is emitted; and while maintaining the light sources of the backlight panel turned off, selectively control transistors of the transistor array layer to repetitively cycle the directional orientation of liquid crystals of corresponding pixels between the at least two offset directions to at least partially erase a retained pattern bias among the pixels.

4. The LCD display unit of claim 1, wherein the LCD controller is further operative during the retained pattern erase mode to:

while maintaining the light sources of the backlight panel turned off or dimmed below the threshold level, selectively control transistors of the transistor array layer to repetitively cycle the directional orientation of liquid crystals of corresponding pixels spatially aligned with a first color area of the color filter layer between first and second offset directions having a first angular offset, and selectively control other transistors of the transistor array layer to repetitively cycle the directional orientation of liquid crystals of corresponding pixels spatially aligned with a second color area of the color filter layer between third and fourth offset directions having a second angular offset, wherein the first color is different than the second color, wherein the first angular offset is greater than the second angular offset.

5. The LCD display unit of claim 4, wherein the first angular offset is between 45 and 180 degrees and the second angular offset is between 15 and 45 degrees.

6. The LCD display unit of claim 4, wherein the first angular offset is between 75 and 180 degrees and the second angular offset is between 45 and 75 degrees.

7. The LCD display unit of claim 4, wherein the first angular offset is between 90 and 180 degrees and the second angular offset is between 45 and 90 degrees.

8. The LCD display unit of claim 4, wherein the LCD controller is further operative during the retained pattern erase mode to:

while maintaining the light sources of the backlight panel turned off or dimmed below the threshold level, selectively control other transistors of the transistor array layer to repetitively cycle the directional orientation of liquid crystals of corresponding pixels spatially aligned with a third color area of the color filter layer between fifth and sixth offset directions having a third angular offset, wherein the third color is different than the first and second colors, wherein the third angular offset is less than the second angular offset, wherein the first, second, and third colors are different ones of red, green, and blue color filters.

9. The LCD display unit of claim 1, wherein the LCD controller is further operative during the retained pattern erase mode to:

while maintaining the light sources of the backlight panel turned off or dimmed below the threshold level, selectively control transistors of the transistor array layer to repetitively cycle at a frequency during a first time duration the directional orientation of liquid crystals of corresponding pixels spatially aligned with a first color area of the color filter layer between offset directions, and selectively control other transistors of the transistor array layer to repetitively cycle at a frequency during a second time duration the directional orientation of liquid crystals of corresponding pixels spatially aligned with a second color area of the color filter layer between offset directions, wherein the first color is different than the second color, wherein the first time duration is greater than the second time duration.

10. The LCD display unit of claim 9, wherein the LCD controller is further operative during the retained pattern erase mode to:

while maintaining the light sources of the backlight panel turned off or dimmed below the threshold level, selectively control other transistors of the transistor array layer to repetitively cycle at a frequency during a third time duration the directional orientation of liquid crystals of corresponding pixels spatially aligned with a third color area of the color filter layer between offset directions, wherein the third color is different than the first and second colors, wherein the third time duration is less than the second time duration, wherein the first, second, and third colors are different ones of red, green, and blue color filters.

11. The LCD display unit of claim 9, wherein the first time duration is between 10 minutes and 60 minutes and the second time duration is between 1 minute and 10 minutes.

12. The LCD display unit of claim 9, wherein the first time duration is between 20 minutes and 120 minutes and the second time duration is between 10 minutes and 20 minutes.

13. The LCD display unit of claim 1, wherein the LCD controller is further operative during the retained pattern erase mode to:

retrieve from a memory of the LCD display unit a pattern in an image that has been displayed through the liquid crystal layer;

while maintaining the light sources of the backlight panel turned off or dimmed below the threshold level, selectively control transistors of the transistor array layer to repetitively cycle at a frequency during a first time duration the directional orientation of liquid crystals of pixels corresponding to locations within the pattern between the at least two offset directions to at least partially erase a retained pattern bias among the pixels, and selectively control transistors of the transistor array layer to repetitively cycle at a frequency during a second time duration the directional orientation of liquid crystals of pixels corresponding to locations outside the pattern between the at least two offset directions, wherein the first time duration is greater than the second time duration.

14. The LCD display unit of claim 13, wherein the LCD controller is further operative to:

responsive to determining that the image that has been displayed through the liquid crystal layer for at least a threshold time, store the image in the memory of the LCD display unit for use during the retained pattern erase mode.

15. The LCD display unit of claim 1, wherein the LCD controller is further operative during the retained pattern erase mode to:

retrieve from a memory of the LCD display unit a pattern in an image that has been displayed through the liquid crystal layer;

while maintaining the light sources of the backlight panel turned off or dimmed below the threshold level, selectively control transistors of the transistor array layer to repetitively cycle at a first frequency for a first time duration the directional orientation of liquid crystals of pixels corresponding to locations within the pattern between the at least two offset directions to at least partially erase a retained pattern bias among the pixels, and selectively control transistors of the transistor array layer to repetitively cycle at a second frequency for a second time duration the directional orientation of liquid crystals of pixels corresponding to locations outside the pattern between the at least two offset directions, wherein the first frequency is greater than the second frequency.

16. The LCD display unit of claim 15, wherein the LCD controller is further operative to:

responsive to determining that the pattern in the image has been displayed through the liquid crystal layer for at least a threshold time, store the pattern in the memory of the LCD display unit for use during the retained pattern erase mode.

17. The LCD display unit of claim 15, wherein the first and second time durations are the same.

18. The LCD display unit of claim 15, wherein the first time duration is greater than the second time duration.

* * * * *